(12) United States Patent
Stinnertz et al.

(10) Patent No.: US 7,082,799 B2
(45) Date of Patent: Aug. 1, 2006

(54) DRIVE SYSTEM FOR A ROLLING MILL

(75) Inventors: Horst Stinnertz, Willich (DE); Michael Baensch, Mönchengladbach (DE)

(73) Assignee: SMS Meer GmbH, Monchengladbach (DE)

( * ) Notice: Subject to any disclaimer, the term of this patent is extended or adjusted under 35 U.S.C. 154(b) by 200 days.

(21) Appl. No.: 10/480,857

(22) PCT Filed: Sep. 12, 2002

(86) PCT No.: PCT/EP02/10219

§ 371 (c)(1),
(2), (4) Date: Dec. 12, 2003

(87) PCT Pub. No.: WO03/028913

PCT Pub. Date: Apr. 10, 2003

(65) Prior Publication Data

US 2004/0173001 A1   Sep. 9, 2004

(30) Foreign Application Priority Data

Sep. 25, 2001 (DE) .............................. 101 47 046

(51) Int. Cl.
*B21B 21/00* (2006.01)

(52) U.S. Cl. .......................... 72/214; 72/249; 74/590; 74/591

(58) Field of Classification Search ............... 72/249, 72/214; 248/123.2; 74/590
See application file for complete search history.

(56) References Cited

U.S. PATENT DOCUMENTS

| | | | | |
|---|---|---|---|---|
| 3,335,593 A | * | 8/1967 | Zeunert | 72/249 |
| 3,337,209 A | | 8/1967 | Kozhevnikov et al. | |
| 5,224,369 A | * | 7/1993 | Rehag et al. | 72/214 |
| 5,540,076 A | * | 7/1996 | Baensch et al. | 72/214 |

FOREIGN PATENT DOCUMENTS

| | | |
|---|---|---|
| DE | 962 062 | 4/1957 |
| DE | 36 13 036 | 8/1987 |
| DE | 37 25 497 | 9/1989 |
| DE | 43 36 422 | 4/1995 |
| JP | 63260608 | 10/1988 |

OTHER PUBLICATIONS

Valchovny Trub Chomutov a.s. (cz technology, Sep. 2003).

* cited by examiner

*Primary Examiner*—Derris H. Banks
*Assistant Examiner*—Debra Wolfe
(74) *Attorney, Agent, or Firm*—Andrew Wilford

(57) ABSTRACT

The invention concerns a drive system (1) for a rolling mill, especially for a cold pilger rolling mill with at least one roll frame (1) movable back and forth, at least one crank drive (3) which has a crank arm (4) with a counterweight (5) for at least partial compensation of the inertial forces produced by the mill frame (2), a drive (6) and a connecting rod (7) which articulates the mill frame (2) and the crank arm (4) with one another and at least one counterweight (8, 9) which is eccentrically rotatable and serves to compensate the inertial forces and/or the moments of inertia. To achieve an efficient balancing of the inertial forces with a simple construction of the drive system, the invention provides that at least one counterweight (8, 9) is rotatably driven by a separate rod (10, 11) independently from the drive (6) of the crank drive.

13 Claims, 1 Drawing Sheet

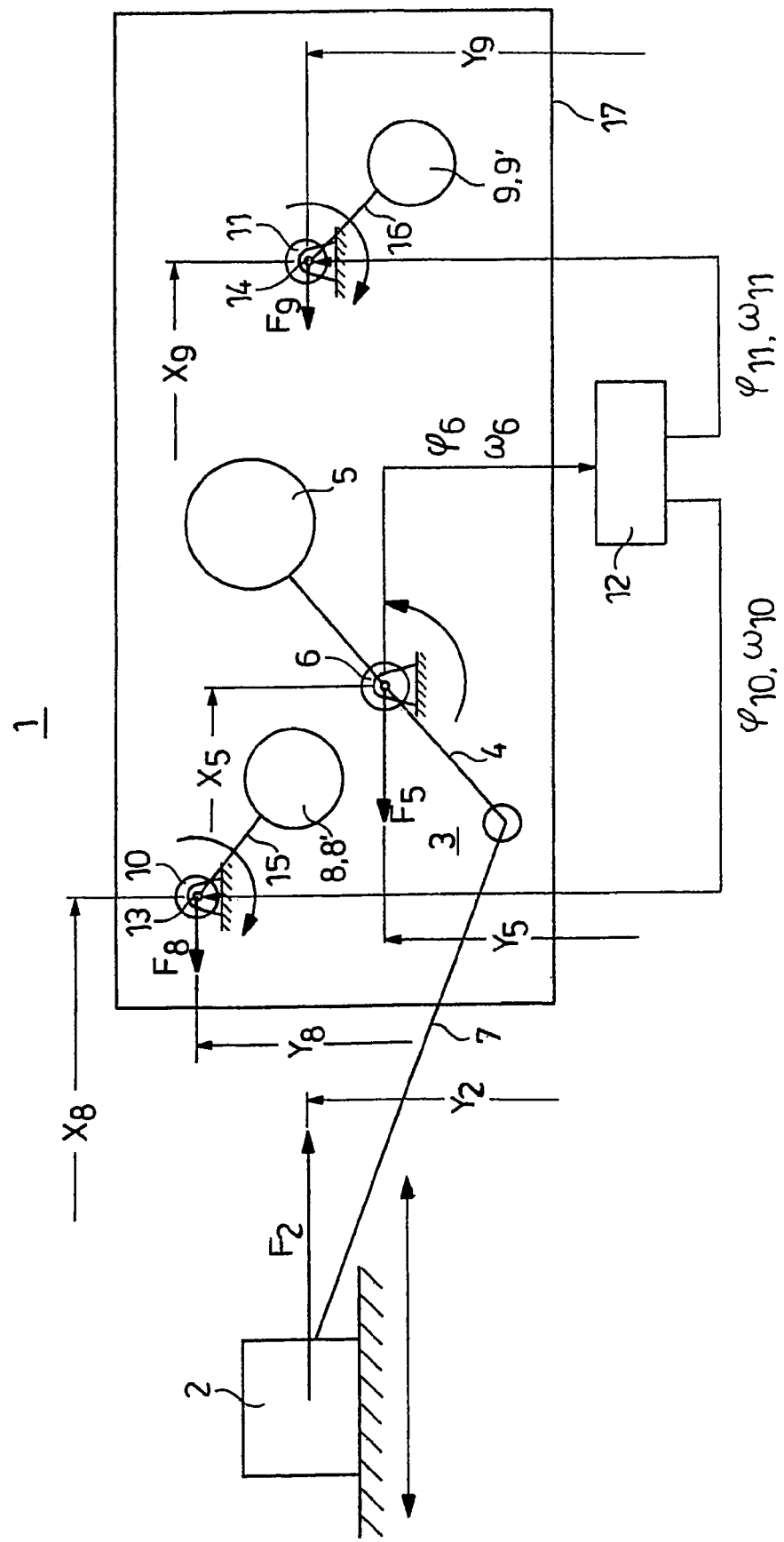

DRIVE SYSTEM FOR A ROLLING MILL

CROSS REFERENCE TO RELATED APPLICATIONS

This application is a national stage of PCT/EP02/10219 filed 12 Sep. 2002 and is based upon a German national application 101 47 046.0 of 25 Sep. 2001 under the International Convention.

FIELD OF THE INVENTION

The invention relates to a drive system for a rolling mill, especially for a cold pilger rolling mill with at least one mill stand capable of being moved back and forth with at least one crank drive having a crank arm with a compensating weight or counterweight to at least partly compensate for the inertial forces produced by the mill stand drive and a connecting rod, the mill stand and crank arm being articulatedly connected with one another, and at least one countermass which is arranged to be eccentrically rotatable to compensate inertial forces and/or inertial moments.

BACKGROUND OF THE INVENTION

A relevant drive for a cold pilger rolling mill is known, for example, from DE 43 36 422 C2. To carry out the cold pilger process, a rolling mill equipped with a cold pilger roll pair is required which can be driven in an oscillating manner. For this purpose a crank drive is used which is driven by a motor. The crank drive is provided with a counterweight to compensate for the inertial forces of the mill stand. However, this weight does not satisfy all of the requirements for a sufficient compensation of the inertial forces and moments of inertia.

The productivity of a cold pilger rolling mill is directly dependent upon the stroke count of the mill stand per unit time which, from the point of view of economy, should have the maximum number of working strokes per minute. This means however that both the drive system and its bearings as well as the foundation and its environment must be subject to large inertial forces.

In DE 43 36 422 C2 it is thus provided that the crank drive, in turn, drives a further shaft via gearing and upon which a counterweight is arranged eccentrically with respect to the center of gravity. This counterweight runs upon rotation in the opposite sense to the crank drive and is in such a position as to generate inertial forces or moments of inertia which are compensatory so that over all an inertial force compensation will be obtained in the entire drive system.

It is a drawback of the known configuration that as a whole it results in a quite expensive construction of the overall drive system because a multiplicity of machine elements, meshing with one another by gearing, is required. As a result there is an increase also in the cost of the drive system and thus of the cold pilger rolling mill, applicable not only to the investment cost for the apparatus itself, but also the cost for the foundation for the apparatus, for replacement and wear parts, and for maintenance and repair.

From German patent DE PS 962 062, a drive system for a cold pilger rolling mill is known in which the crankshaft for driving the mill frame is equipped with centrifugal weights and a vertically oscillating compensating weight for compensating for first order inertial forces as well as the moments of inertia in is the drive.

It is a disadvantage with this solution that the foundation of the rolling mill is very expensive and of high cost construction since the vertical penetration of the compensating weights into the foundation must be provided for. As a consequence a larger and deeper cellar is required which correspondingly increases the cost of the rolling mill.

DE 36/3036 C1 discloses a drive for a rolling mill frame in which a planetary crank drive is used for driving and compensating for the inertial forces and moments of inertia. When an optimal inertial compensation can be achieved with this solution, the drive is satisfactory only for small cold pilger rolling mills because with larger apparatuses, the size of the drive system increases overproportionally and gives rise to higher costs.

All known drive systems for cold pilger rolling mills thus have serious disadvantages whether they involve insufficient reduction of the inertial forces or moments of inertia, high capital or foundation costs and/or an expensive mounting during the fabrication or in repair and maintenance.

OBJECT OF THE INVENTION

The invention has as its object to so form a drive system for a cold pilger rolling mill of the type with which the invention is concerned that with the simplest possible and thus with the lowest cost configuration, the inertial forces can be reduced to a permissible level.

SUMMARY OF THE INVENTION

The object is achieved according to the invention in that at least one counterweight is rotatably driven by a drive which is rotatably driven independently and separately from the drive of the crank drive.

The counterweight or counterweights for compensating for the inertial forces or moments of inertia are thus driven by a motor specifically for this purpose and thus independently of the drive of the crank system which has special advantages:

Firstly a sufficient compensation of the inertial forces and moments of inertia of the mill frame is brought about so that the drive system can operate relatively vibration-free so that the foundation may be less massive and the environment protected. The drive system operates in a more satisfactory manner and has a higher useful life; the costs for maintenance and repair are low.

As a result of the inertial force and moment of inertia compensation, there is also a uniform movement of the crank drive and thus of the mill frame which was not always available with prior art drives.

The capital cost for the cold pilger rolling mill is comparatively small because the drive system is of simple construction. The mounting costs of the drive system are also relatively low. Simultaneously, there is no special stress upon the foundation. The foundation blocks below the crank drive and the machine bed can be so constructed that all of the foundation moments can be absorbed.

Preferably the independent drives or the independent drives for driving the counterweight or counterweights are designed to rotate them in the opposite sense to the rotational direction of the crank arm.

For an optimum inertia compensation it is also advantageous to select the masses of the roll frame, the compensating weight and the countermass or countermasses with respect to the masses which are associated with the crank and the connecting rods so that the inertial forces of the frame are preferably completely balanced or at least balanced to a major extent in the operation of the drive system. It has been found to be advantageous, moreover, when the compensating shaft which drives the countermass is located in the rolling direction behind the crankshaft and at substantially the same height as the crankshaft. With this construction, in accordance with one configuration of the separate drive for the countermass or the compensating shaft, the drive can include a spur gear or cog wheel set which encompasses a pinion on the motor shaft which drives a gear on the crankshaft with a suitable transmission ratio, this gear meshing with a gear of the same size on the compensating shaft.

With respect to the inertial force or moment of inertia compensation, it is further an advantage when two counterweights are arranged mirror-symmetrically to the median plane of the drive system; with respect to this plane, this ensures in a simple manner a balancing of the moments of inertia.

The separate drives for the counterweights is, advantageously, an electric motor. Especially a servomotor can be used, i.e. a motor which can be controlled with respect to rotary speed and rotation angle, automatically to, for example, maintain the set parameters. Between the drive for the crank arm and the separate drive or drives, means can preferably be arranged for controlling or regulating the separate drive or drives. The separate drives can also be controlled or regulated by these means as a function of the rotational angle and/or rotational speed of the drive of the crank arm.

The control or regulating means can ensure that the drive of the crank arm and the drive or drives of the counterweight or the counterweights are effected with the same rotational speed. In addition, a phase-exact operation of the drive of the crank arm and the separate drive or drives of the counterweight or counterweights can be effected. It has been found to be especially advantageous to provide such means that is suitable for rotary speed and angle synchronizing operation of the drive of the crankshaft and the separate drive or drives. In this manner an optimal inertia compensation can be achieved.

For compensation of the moments of inertia, finally, it can be provided in an advantageous manner that the center of rotation of the counterweight or the counterweights is so selected that the inclusion of the inertia forces of the roll frame and/or the compensating weight with the inertia of the crank or connecting rod will at least predominantly balance the moments of inertia of all of the masses of the drive system.

BRIEF DESCRIPTION OF THE DRAWING

In the drawing an embodiment of the invention has been illustrated. The sole FIGURE shows diagrammatically a side view of the drive system for a cold pilger rolling mill.

SPECIFIC DESCRIPTION

The FIGURE shows the construction of a drive system 1 of a cold pilger rolling mill that, as such, has not been illustrated. In a roll frame 2, a cold pilger roll pair is disposed which has also not been illustrated and by means of which the cold pilger rolling process is carried out.

For carrying out this process, the roll frame 2 must undergo an oscillating movement, that is a back and forth movement. To effect this movement, a crank drive 3 is provided which has a crank arm 4 or a crankshaft with at least one offset and a counterweight 5 which is eccentrically arranged with respect to the pivot point. The crank arm 4 and the mill frame 2 are connected by a connecting rod 7 which is articulated both to the crank arm 4 and to the mill frame 2. For the oscillatory drive of the mill frame 2, the crank drive 3 is displaced by means of the drive 6 (configured as an electric motor). The drive 6 thus rotates the crank arm 4 with an angular velocity or rotary speed $\omega_6$ and with a rotation angle $\phi_6$.

The counterweight 5 serves for a partial compensation of the inertial forces which have their origins in the oscillating movement of the mill frame 2. In the present case, about half the inertial force of the mill frame 2 is compensated by each of the counterweights 5. As is schematically illustrated in the Figure, the inertial force F2 of the mill frame 2 is opposite the inertial force F5 of the counterweight 5 so that a partial compensation of these forces is effected.

Nevertheless this partial compensation of the inertial forces is not sufficient for an acceptable operation of the drive system 1. This is first achieved by the counterweights 8 and 9. These counterweights 8 and 9 are eccentrically mounted on cranks 15 or 16 for rotation about respective centers 13 or 14 which coincide with the axis of the respective compensating shaft. The rotation of the counterweights 8 and 9 is effected by drives 10 and 11. The compensating shafts, with axes 13, 14 can be driven by at least one cog wheel or spur gear set.

It can be noted that the counterweights 8 and 9 can be subdivided into partial masses which can be offset from one another in a direction normal to the plane of the drawing. The counterweights 8, 8' or 9, 9' are then positioned mirror-symmetrically to the median plane of the cold pilger rolling mill. Furthermore, a drive system with only one compensating shaft is possible on which the counterweight 8 or the counterweights 8 and 9 are arranged.

Upon rotation of the counterweights 8 or 9, inertial forces F8 or F9 are produced at their centers of rotation 13 or 14. Upon correct phase-oriented rotation of the counterweights 8, 9 relative to the movement of the crank arm 4, these two inertial forces are combined additively with those of the mill frame 2 ($F_2$) and the counterweight 5 ($F_5$) to zero so that an optimal inertial force balance is achieved.

It is important to maintain the phase and rotary speed in the correct relationship by control of the drives 10 and 11. For this purpose an electronic control or regulation is provided at 12 which receives as an input signal the rotational angle $\phi_6$ of the drive 6 as well as its rotary speed $\omega_6$. The control and regulation 12 is effectively an "electrical shaft concept" which is based upon the data which is collected and so operates the drives 10 and 11 so that the latter will have the same rotary speed $\phi_{10}$ or $\phi_{11}$. Furthermore the counterweights 8 and 9 are so driven that for the rotary angle $\phi_{11}$ of the drive 11 a phase-correct relationship to the rotation angle $\phi_6$ is given. The crank arm 4 on one side and the cranks 15 and 16 on the other side rotate at equal speeds, but in opposite senses (see the arrows showing the direction of rotation) whereby the counterweights 8, 9 reach their lowest points when the counterweight 5 reaches its highest point.

The rotary mountings of the three rotational masses 5, 8 and 9 are so positioned on the drive frame 17 that they not only compensate for the inertial force but also the moments of inertia. In a manner known per se, the highest position $y_2$ of the center of gravity of the roll frame 2, the positions $x_5$ and $y_5$ of the centers of rotations of the counterweights 5, the positions $x_8$ and $y_8$ of the centers of rotation 13 of the first counterweight 8 and the positions $x_9$ with the rotational center of the second counterweight 9 are so selected that the moments of inertia, that is the products of the inertial forces and their respective effective lever arms are completely in balance.

The drive system thus has a very simple construction which is the origin of its low capital cost. In addition the good compensation of inertial forces and moments of inertia is possible so that a low vibration operation of the cold pilger rolling mill is possible.

The concept of the invention is suitable also for use with only a single counterweight. On the other hand, it can be advantageous when two or more counterweights are used in the described manner.

The invention claimed is:

1. A drive system for a rolling mill, especially for a cold pilger rolling mill with
   at least one mill frame movable back and forth,
   at least one crank drive which includes a crank arm with a first counterweight for at least partial compensation for the inertial forces generated by the mill frame, a drive and a connecting rod which articulates the mill frame and the crank arm with one another, and
   at least one further counterweight for compensating for inertial forces and/or moments of inertia which is arranged to be eccentrically rotatable,
   the at least one further counterweight being rotatably driven by a separate drive independently from the drive of the crank drive.

2. The drive system according to claim 1 wherein the independent drive for driving the further counterweight is driven in a rotational sense opposite a rotational direction of the crank arm.

3. The drive system according to claim 1 wherein a mass of the mill frame, a mass of the first counterweight and a mass of the counterweight of the independent drive are so selected that the inertial forces of the frame are balanced to the first order at least substantially in operation of the drive system.

4. The drive system according to claim 1 wherein each of two further counterweights are arranged in mirror-symmetrical relationship with respect to a median plane of the drive system.

5. The drive system according to claim 1 wherein a compensating shaft carrying the further counterweight is arranged in a rolling direction of the mill behind a crankshaft for said crank arm at substantially the same height as the crankshaft.

6. The drive system according to claim 5 wherein the compensating shaft is driven by at least one cog wheel set which includes a pinion on a motor shaft which drives a gear on a crankshaft with a transmission ratio and a gear of the same size meshing therewith on the compensating shaft.

7. The drive system according to claim 1 wherein the separate drive is an electric motor.

8. The drive system according to claim 7 wherein the electric motor is a servomotor.

9. The drive system according to claim 1, further comprising means for controlling or regulating the separate drive as a function of an angle of rotation ($\phi_6$) and/or an angular velocity ($\omega_6$) of the drive for the crank arm.

10. The drive system according to claim 9 wherein said means for controlling or regulating operates a plurality of separate drives with a common angular velocity ($\omega_6$, $\omega_{10}$, $\omega_{11}$).

11. The drive system according to claim 9 wherein said means for controlling or regulating provides phase-exact operation of the drive of the crank arm and the separate drive.

12. The drive system according to claim 9 wherein said means for controlling or regulating provides speed synchronous and angle synchronous operation of the drive of the crank arm (4) and the separate drive.

13. The drive system according to claim 1 wherein rotational centers of all further counterweights are so chosen that by inclusion of inertial forces of the roll frame and/or of the first counterweight all moments of inertia of the drive system are at least largely compensated.

* * * * *